US006352341B2

(12) United States Patent
Kovacs et al.

(10) Patent No.: US 6,352,341 B2
(45) Date of Patent: *Mar. 5, 2002

(54) INK JET PRINTING PROCESS

(75) Inventors: Csaba A. Kovacs; Teh-Ming Kung; Charles E. Romano, Jr., all of Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,653

(22) Filed: Dec. 18, 1998

(51) Int. Cl.[7] .............................. B41J 2/01; B05D 5/00; B32B 27/08; B32B 27/34

(52) U.S. Cl. .................... 347/101; 347/105; 428/474.4; 427/288

(58) Field of Search ............................ 347/47, 95, 100, 347/105, 101, 106; 428/327, 195, 206, 409, 474.4; 427/288; 106/31.13, 31.6, 31.83

(56) References Cited

U.S. PATENT DOCUMENTS

| | | | | | |
|---|---|---|---|---|---|
| 4,052,373 | A | * | 10/1977 | Sera et al. | 260/117 |
| 4,383,018 | A | * | 5/1983 | Martin et al. | 430/14 |
| 4,419,388 | A | * | 12/1983 | Sugiyama et al. | 427/288 |
| 4,554,181 | A | * | 11/1985 | Cousin et al. | 427/261 |
| 4,902,593 | A | * | 2/1990 | Vermeulen et al. | 430/10 |
| 4,987,043 | A | * | 1/1991 | Roosen et al. | 430/7 |
| 5,088,047 | A | * | 2/1992 | Bynum | 364/474.24 |
| 5,270,073 | A | * | 12/1993 | Koshizuka et al. | 427/146 |
| 5,372,884 | A | * | 12/1994 | Abe et al. | 428/331 |
| 5,403,362 | A | * | 4/1995 | Gurley | 8/618 |
| 5,429,860 | A | * | 7/1995 | Held et al. | 428/195 |
| 5,474,843 | A | * | 12/1995 | Lambert et al. | 428/327 |
| 5,478,631 | A | * | 12/1995 | Kawano et al. | 428/212 |
| 5,521,140 | A | * | 5/1996 | Matsuda et al. | 503/227 |
| 5,624,743 | A | * | 4/1997 | Malhotra | 428/216 |
| 5,688,603 | A | * | 11/1997 | Iqbal et al. | 428/532 |
| 5,707,722 | A | * | 1/1998 | Iqbal et al. | 428/304.4 |
| 5,733,672 | A | * | 3/1998 | Lambert | 428/704 |
| 5,858,629 | A | * | 1/1999 | Ishikawa et al. | 430/380 |
| 5,932,355 | A | * | 8/1999 | Iqbal et al. | 428/447 |
| 5,998,119 | A | * | 12/1999 | Aylward et al. | 430/536 |
| 6,054,223 | A | * | 4/2000 | Tsuchiya et al. | 428/478.2 |
| 6,066,215 | A | * | 5/2000 | Simons | 156/60 |
| 6,102,997 | A | * | 8/2000 | Helling et al. | 106/31.43 |

FOREIGN PATENT DOCUMENTS

| | | | | | |
|---|---|---|---|---|---|
| DE | 3778545 | | * | 5/1992 | |
| EP | 1010539 | | * | 6/2000 | 347/101 |
| GB | 2 324 800 | A | | 11/1998 | |
| JP | 402032891 | A | * | 2/1990 | |
| JP | 407189194 | A | * | 7/1995 | |
| JP | 408076400 | A | * | 3/1996 | |
| JP | 408108616 | A | * | 4/1996 | |
| JP | 408282094 | A | * | 10/1996 | |
| JP | 10-219157 | | | 8/1998 | |
| WO | 95/16561 | | * | 6/1995 | |

* cited by examiner

*Primary Examiner*—Kimberly L. Asher
(74) *Attorney, Agent, or Firm*—Harold E. Cole

(57) ABSTRACT

An ink jet printing process for improving the wet abrasion resistance of an ink jet image comprising: providing an ink jet recording element comprising a support having thereon an image-recording layer comprising a cross-linkable polymer of gelatin or acetoacetylated poly(vinyl alcohol) and a mordant; applying liquid ink droplets of a cationic, water-soluble dye on the image-recording layer in an image-wise manner; and applying an aqueous solution of an organic hardener or a sulfate of a trivalent metal to the image to cross-link the polymer.

10 Claims, No Drawings

INK JET PRINTING PROCESS

CROSS REFERENCE TO RELATED APPLICATION

Reference is made to commonly-assigned copending U.S. patent application Ser. No. 09/216,531, filed of even date herewith, Docket 78773HEC entitled "Ink Jet Printing Process", of Gallo et al; and Copending U.S. patent application Ser. No. 09/215,711, filed of even date herewith, Docket 78797HEC entitled "Ink Jet Printing Process", of Romano, Jr., et al; and Copending U.S. patent application Ser. No. 09/216,558, filed of even date herewith, Docket 78798HEC entitled "Ink Jet Printing Process", of Romano, Jr., et al; and Copending U.S. patent application Ser. No. 09/216,149, filed of even date herewith, Docket 78799HEC entitled "Ink Jet Composition", of Romano, Jr., et al; and Copending U.S. patent application Ser. No. 09/216,288, filed of even date herewith, Docket 78818HEC entitled "Ink Jet Printing Process", of Kovacs et al; and Copending U.S. patent application Ser. No. 09/216,350, filed of even date herewith, Docket 78819HEC entitled "Ink Jet Printing Process", of Kovacs et al; and Copending U.S. patent application Ser. No. 09/216,147, filed of even date herewith, Docket 78820HEC entitled "Ink Jet Ink Composition", of Kovacs et al; and Copending U.S. patent application Ser. No. 09/216,203, filed of even date herewith, Docket 78846HEC entitled "Ink Jet Printing Method", of Romano, Jr., et al; and Copending U.S. patent application Ser. No. 09/216,304 filed of even date herewith, Docket 78847HEC entitled "Ink Jet Printing Method", of Kovacs et al; and Copending U.S. patent application Ser. No. 09/083,875, filed May 22, 1998, entitled "Inkjet Images on PVA Overcoated with Hardener Solution", of Erdtmann et al.; and Copending U.S. patent application Ser. No. 09/083,605 filed May 22, 1998, entitled "Ink Jet Prints Overcoated with Hardener", of Erdtmann et al., the teachings of which are incorporated herein by reference.

FIELD OF THE INVENTION

This invention relates to an ink jet printing process for improving the wet abrasion resistance of an ink jet image formed from an aqueous ink containing a cationic dye.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor wet abrasion.

DESCRIPTION OF RELATED ART

JP 10-219157 relates to an ink jet ink comprising an aqueous medium, a colorant and a very small amount of glutaraldehyde as a biocide.

There is a problem with using this ink, however, in that when it is printed on an image-recording element, the resultant image has poor wet abrasion resistance.

It is an object of this invention to provide an ink jet printing process for improving the wet abrasion resistance of an ink jet image formed from an aqueous ink containing a cationic dye. It is another object of this invention to provide an ink jet printing process wherein a hardener is applied to improve the wet abrasion resistance of the ink jet image. It is another object of the invention to provide an ink jet printing process where the laydown of the hardener applied can be precisely controlled independently of ink laydown and can be applied non-imagewise to the entire element.

SUMMARY OF THE INVENTION

These and other objects are achieved in accordance with the present invention which comprises an ink jet printing process for improving the wet abrasion resistance of an ink jet image comprising:

a) providing an ink jet recording element comprising a support having thereon an image-recording layer comprising a cross-linkable polymer of gelatin or acetoacetylated poly(vinyl alcohol) and a mordant;

b) applying liquid ink droplets of a cationic, water-soluble dye on the image-recording layer in an image-wise manner; and c) applying an aqueous solution of an organic hardener or a sulfate of a trivalent metal to the image to cross-link the polymer. It was found that when an aqueous solution containing a hardener is applied to a cationic dye-based ink image where the image-receiving layer has a cross-linkable polymer and a mordant, that the wet abrasion resistance of the image is improved.

DETAILED DESCRIPTION OF THE INVENTION

This process offers an advantage over incorporating a hardener in an ink since the hardener can be applied in both imaged and non-imaged areas, and the laydown can be precisely controlled independent of ink laydown.

The hardeners employed in the invention may be used at concentrations ranging from 0.10 to 5.0 weight percent of active ingredient in the aqueous solution, preferably 0.25 to 2.0 weight percent. This aqueous hardener solution may be applied from a ink jet print head so that the final coverage of the hardener is from about 0.00002 g/m$^2$ to about 0.001 g/m$^2$, preferably from about 0.00005 g/m$^2$ to about 0.0004 g/m$^2$.

The aqueous hardener solution may also contain, if desired, co-solvents, humectants, surfactants, and other ingredients commonly added to ink jet inks.

The organic hardener or a sulfate of a trivalent metal that can be employed in the invention include the following (including mixtures thereof):

a) formaldehyde and compounds that contain two or more aldehyde functional groups such as the homologous series of dialdehydes ranging from glyoxal to adipaldehyde including succinaldehyde and glutaraldehyde; diglycolaldehyde; aromatic dialdehydes, etc.;

b) blocked hardeners (substances usually derived from the active hardener that release the active compound under appropriate conditions) such as substances that contain blocked aldehyde functional groups, such as tetrahydro4-hydroxy-5-methyl-2 (1H)-pyrimidinone polymers, polymers of the type having a glyoxal polyol reaction product consisting of 1 anhydroglucose unit: 2 glyoxal units, dimethoxylethanal-melamine non-formaldehyde resins, 2,3-dihydroxy-1,4-dioxane, blocked dialdehydes and N-methylol compounds obtained from the condensation of formaldehyde with various aliphatic or cyclic amides, ureas, and nitrogen heterocycles;

c) active olefinic compounds having two or more olefinic bonds, especially unsubstituted vinyl groups, activated by adjacent electron withdrawing groups, such as divinyl ketone; resorcinol bis(vinylsulfonate); 4,6-bis (vinylsulfonyl)-m-xylene; bis(vinylsulfonylalkyl) ethers and amines; 1,3,5-tris(vinylsulfonyl) hexahydro-s-triazine; diacrylamide; 1,3-bis(acryloyl)urea; N,N'-bismaleimides; bisisomaleimides; bis(2-acetoxyethyl) ketone; 1,3,5-triacryloylhexahydro-s-triazine; and blocked active olefins of the type bis(2-acetoxyethyl) ketone and 3,8-dioxodecane- 1, 10-bis(pyridinium perchlorate) bis(vinyl sulfonylmethane), bis(vinyl sulfonylmethyl ether), and the like; and d) sulfates of a trivalent metal such as aluminum sulfate, iron sulfate, boron sulfate, gallium sulfate, indium sulfate, titanium sulfate, etc.

Specific examples of hardeners useful in the composition of the invention include the following:

| | |
|---|---|
| Hardener 1: | aluminum sulfate |
| Hardener 2: | bis(vinyl sulfonylmethane) (Eastman Kodak Company) |
| Hardener 3: | 2,3-dihydroxy-1,4-dioxane (Aldrich Chemical Co.) |
| Hardener 4: | blocked hexamethylene diisocyanate (Bayer Co.) |
| Hardener 5: | glyoxal |
| Hardener 6: | bis(vinyl sulfonylmethyl ether) (Eastman Kodak Company) |
| Hardener 7: | glutaraldehyde |
| Hardener 8: | a glyoxal polyol reaction product consisting of 1 anhydroglucose unit: 2 glyoxal units, SEQUAREZ ® 755 (Sequa Chemicals, Inc.) |
| Hardener 9: | a cyclic urea glyoxal condensate consisting of 1 cyclic urea unit: 1 glyoxal unit, SUNREZ ® 700M (Sequa Chemicals, Inc.) |
| Hardener 10: | dimethoxylethanal-melamine non-formaldehyde resin, Sequa CPD3086-100 (Sequa Chemicals, Inc) |
| Hardener 11: | phthaldehyde |
| Hardener 12: | formaldehyde |
| Hardener 13: | iron III sulfate |

In a preferred embodiment, the hardener employed in the composition of the invention is aluminum sulfate, bis(vinyl sulfonylmethyl ether), glutaraldehyde, 2,3-dihydroxy- 1,4-dioxane or phthaldehyde.

The aqueous hardener solution may be applied to the ink jet image in accordance with the invention in a non-imagewise manner either through a separate thermal or piezoelectric printhead, or by any other method which would apply the hardener solution evenly to the image, such as a spray bar or immersing the element in a bath of hardener. Methods of applying a hardener solution are disclosed in commonly-owned U.S. patent application Ser. No. 09/083,673 filed May 22, 1998, entitled "Printing Apparatus With Spray Bar For Improved Durability" of Wen et al. and U.S. patent application Ser. No. 09/083,876, filed May 22, 1998, entitled "Ink Jet Printing Apparatus With Print Head For Improved Image Quality" of Wen et al., the disclosures of which are incorporated herein by reference.

Any cationic, water-soluble dye may be used in the invention, e.g., a dye having a positive charge obtained either by the protonation of an amino group in the dye molecule or by incorporating a positive charge into the dye chromophore. For the protonation, any acid may be used such as lactic acid, citric acid, phthalic acid, maleic acid, acetic acid, etc.

The protonated dye may be pre-formed or prepared in situ. In general, cationic dyes are basic dyes such as azo dyes, triphenylmethane dyes, azine dyes, oxazine dyes, thiazine dyes and the like having amine salt residues or quaternary ammonium groups. Specific examples of basic dyes which can be used in the invention include the following COLOR INDEX numbers: C.I. Basic Yellows 1, 2, 11, 13, 14, 19, 21, 25, 28, 32, 33, 34, 35 and 36, for yellow dyes; C.I. Basic Reds 1, 2, 9,12,13, 14, 15, 17, 18, 22, 23, 24, 27, 29, 32, 38, 39 and 40, and C.I. Basic Violets 7, 10, 15, 21, 25, 26, 27 and 28, for magenta dyes; C.I. Basic Blues 1,3, 5, 7, 9, 19, 21,22, 24, 25, 26, 28, 29, 40, 41, 44, 45, 47, 54, 58, 59, 60, 64, 65, 66, 67, 68 and 75, for cyan dyes; and C.I. Basic Blacks 2 and 8, for black dyes. Mixtures of these dyes may also be used.

The dye may be present in an amount of from about 0.1 to about 10% by weight, preferably from about 0.25 to about 3% by weight.

A mordant can be used in the image-recording element used in the invention to fix the cationic dye. For example, there may be used an anionic polymer such as sulfonated and carboxylated polyesters, sulfonated and carboxylated acrylates, poly(vinyl sulfonic acid), poly(vinyl styrene sulfonate sodium salt), sulfonated and carboxylated polyurethanes, sulfonated polyamides, polyolefinic emulsions, carboxylated butadiene, or derivitized anionic gelatin. In a preferred embodiment, the following mordants may be employed in a recording element used in the invention:

| | |
|---|---|
| Mordant 1 | polyester dispersion AQ29 (Eastman Chemical Co.) |
| Mordant 2 | polyester dispersion AQ38 (Eastman Chemical Co.) |
| Mordant 3 | polyester dispersion AQ48 (Eastman Chemical Co.) |
| Mordant 4 | polyester dispersion AQ55 (Eastman Chemical Co.) |
| Mordant 5 | sulfonated polyester EvCote ® EV-LC (EvCo Research Co.) |
| Mordant 6 | carboxylated polyester EvCote ® EV-565 (EvCo Research Co.) |

The above mordants may be employed in any amount effective for the intended purpose. In general, good results are obtained when the mordant is present in an amount of from about 0.5 to about 5 $g/m^2$ of element.

As noted above, the cross-linkable polymer employed in the invention is gelatin or acetoacetylated poly(vinyl alcohol). Gelatin which may be used include the conventional lime-processed ossein, acid-processed ossein or pig skin gelatin. In addition, there are a variety of chemically-modified gelatins formed by reacting the amino group of lysine which can be used. Some functional groups that have been added to gelatin include: phthalate, phenylcarbamyl, succinyl, carbamyl, lauryl, and dodecenyl succinyl. There can also be used quaternized gel, silanol modified gel, and graft copolymers of gel with poly(styrene sulfonate), poly (vinylpyrrolidone), and poly(methacrylic acid).

The acetoacetylated poly(vinyl alcohol) useful in the invention is described in U.S. Pat. No. 4,350, 788, the disclosure of which is hereby incorporated by reference. These materials are available commercially as Gohsefimer® Z-200 from Nippon Gohsei.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV- absorbing agents; mildew-proofing agents; mordants; antistatic agents, anti-oxidants, optical brighteners, and the like. A hardener may also be added to the ink-receiving layer if desired.

Ink jet inks used in the process of the present invention are well-known in the art. The ink compositions used in ink jet printing typically are liquid compositions comprising a solvent or carrier liquid, dyes, humectants, organic solvents, detergents, thickeners, preservatives, conductivity enhancing agents, anti-kogation agents, drying agents, defoamers, etc. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols.

A carrier can be present in the ink jet ink and can vary widely, depending on the nature of the ink jet printer for which the inks are intended. For printers which use aqueous inks, water, or a mixture of water with miscible organic co-solvents, is the preferred carrier medium. Co-solvents (0–20 wt. % of the ink) are added to help prevent the ink from drying out or crusting in the orifices of the printhead or to help the ink penetrate the receiving substrate. Preferred co-solvents for the inks employed in the present invention include glycerol, ethylene glycol, propylene glycol, 2-methyl-2,4-pentanediol, and diethylene glycol, and mixtures thereof, at overall concentrations ranging from 5 to 20 wt. % of the ink.

The support for the ink jet recording element used in the invention can be any of those usually used for ink jet receivers, such as paper, resin-coated paper, poly(ethylene terephthalate), poly(ethylene naphthalate) and microporous materials such as poly polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861.

The support used in the invention may have a thickness of from about 50 to about 500 μm, preferably from about 75 to 300 μm. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 μm.

The image-recording layer may be present in any amount which is effective for the intended purpose. In general, good results are obtained when it is present in an amount of from about 5 to about 30 g/m$^2$, preferably from about 8 to about 15 g/m$^2$, which corresponds to a dry thickness of about 5 to about 30 μm, preferably about 8 to about 15 μm.

The following examples are provided to illustrate the invention.

EXAMPLES

Control Example 1

Preparation of Receiver A

A 102 μm poly(ethylene terephthalate) film support was coated with a subbing layer of acrylonitrile-vinylidene chloride-acrylic acid terpolymer latex (0.11 g/m$^2$). On top of the subbing layer was coated a solvent-absorbing layer of Mordant 4 (3.3 g/m 2), lime-processed Ossein photographic gelatin (Eastman Gelatin) (3.74g/m$^2$) and styrene-butadiene polymeric beads (0.11 g/m$^2$) having an average size of 10 μm. Over this layer was coated an ink-receiving layer of Mordant 4 (0.44 g/m$^2$) and lime-processed Ossein photographic gelatin (1.76 g/m$^2$).

Preparation of Cyan Ink

An ink was prepared by dissolving 5 parts by weight cyan dye (Structure 1 below) with stirring in a mixture of 60 parts glycerol humectant, 60 parts diethylene glycol humectant, 3 parts of Surfynol® 465 surfactant, 1 part of 10% Proxel® GXL biocide in water, 8 parts of 85% lactic acid in water (to protonate the dye) and 860 parts of deionized water as the solvent.

Structure 1

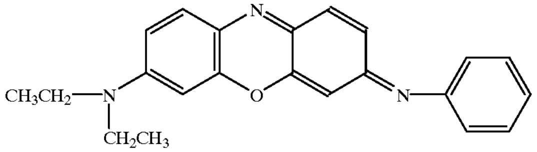

The top of a black ink cartridge of an Epson 200 ink jet printer was opened with a knife. The Epson ink and the sponge were removed and the cartridge was washed with water and ethanol and dried. The sponge was replaced with a Willtec® (Illbruck Co.) sponge. The cyan ink described above was filtered with a Autovial® 0.45 μm membrane filter (Whatman, Cat. No. AV125UGMF) and the cartridge was filled with the filtered cyan ink. The top of the black cartridge was re-sealed with Permacel® tape (Permacel Company, P-252). A 18 cm ×23 cm print at 100% laydown was made using the Epson 200 printer at 360 dpi resolution on Receiver A.

Three full spectral measurements were taken from 340 nm to 800 nm at 4 cm from the print edges and one at center of one strip with a Hewlett-Packard 8450A Diode Array spectrophotometer. The strip was soaked for 30 minutes in deionized water. While still wet, the strips were secured on a metal bar with a 500 g load on top. The strips were then placed on a wet sponge, 4 cm wide Willtec® (Illbruck Co.)

and rubbed 10 times. The strips were then allowed to dry at ambient temperature overnight and re-measured at the same three locations as above. The percent total retained optical density was calculated by dividing the average optical density measured from the base line to the peak at maximum absorption after the rub by the average optical density measured from the base line to the peak at maximum absorption before the rub and multiplying the result by one hundred. The results are shown in Table 1.

Invention Example 1

This example was the same as Control Example 1 except that after printing, the image was overprinted at 100% laydown with an Epson 200 printer equipped with a converted refillable black ink cartridge containing a solution of 12 parts of diethylene glycol humectant, 84 parts of deionized water and 4 parts of the hardener 1 at a plain paper 360 dpi high density setting and allowed to air dry overnight. This element was tested as in Control Example 1.

TABLE 1

| Hardener | Retained Optical Density |
|---|---|
| None (Control) | 52 |
| 1 | 93 |

The above results show that an ink jet image obtained in accordance with the invention has superior wet abrasion resistance as compared to a control element which was not over-printed with a hardener solution.

Example 2

Preparation of Receiver B

This was the same as Receiver A except that in the solvent-absorbing layer was lime-processed Ossein photographic gelatin (Eastman Gelatin) (6.05g/m$^2$) and the ink-receiving layer was Mordant 4 (0.77 g/m$^2$), lime-processed Ossein photographic gelatin (2.42 g/m$^2$) and styrene-butadiene polymeric beads (0.11 g/m$^2$) having an average size of 10 $\mu$m.

Preparation of Magenta Ink

This was the same as the cyan ink except that magenta dye structure 2 was employed:

Structure 2

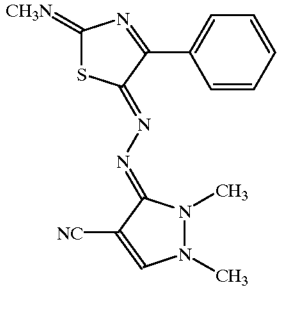

This element was printed and tested as in Example 1 except using Receiver B, magenta ink and the method for applying the hardener. Four strips 20 were cut as in Example 1. Separate strip were soaked for five minutes in solution with concentrations of 0.25%, 0.5%, 1.0% and 2.0% of Hardener 3 in deionized water. The strips were dried at ambient temperature. The results for the different hardener concentrations are shown in Table 2.

TABLE 2

| % Concentration of Hardener 3 Solution | % Total Retained Optical Density |
|---|---|
| 0.0 (control) | 24 |
| 0.25 | 94 |
| 0.5 | 100 |
| 1.0 | 105 |
| 2.0 | 99 |

The above results show an ink jet image obtained in accordance with the invention has superior wet abrasion resistance as compared to a control element which was not treated with a hardener solution.

Example 3

This example was the same as Example 2 except that Receiver A was used and different hardeners were used as shown in Table 3,including control hardeners of zinc sulfate (divalent metal sulfate) and aluminum nitrate (trivalent metal, non-sulfate).

TABLE 3

| Hardener | % Total Retained Optical Density |
|---|---|
| Zinc sulfate (control) | 13 |
| Aluminum nitrate (control) | 13 |
| 1 | 85 |
| 2 | 99 |
| 7 | 100 |
| 12 | 100 |
| 13 | 83 |

The above results show that an ink jet image obtained in accordance with the invention has superior wet abrasion resistance as compared to control elements which were treated with a hardener solutions which were not sulfates of a trivalent metal.

Example 4

Preparation of Receiver C

A 102 $\mu$m poly(ethylene terephthalate) film support was coated with a subbing layer of acrylonitrile-vinylidene chloride-acrylic acid terpolymer latex (0.11 g/m$^2$). On top of the subbing layer was coated a solvent-absorbing layer of lime-processed Ossein photographic gelatin (Eastman Gelatin) (5.91g/m$^2$). Over this layer was coated an ink-receiving layer of Mordant 4 (1.5 g/m$^2$), lime-processed Ossein photographic gelatin (1.61 g/m$^2$) and styrene-butadiene polymeric beads (0.11 g/m$^2$) having an average size of 5 $\mu$m.

Preparation of Magenta Ink

An ink was prepared by dissolving 5 parts by weight magenta dye (Structure 3 below) with stirring in a mixture of 60 parts glycerol humectant, 60 parts diethylene glycol humectant, 3 parts of Surfynol® 465 surfactant, 1 part of 10% Proxel® ( GXL biocide in water and 860 parts of deionized water as the solvent.

Structure 3

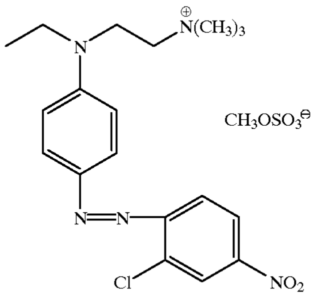

(Basic Red 18)

Printing

A Hewlett-Packard cartridge (HP 51626A) was obtained and emptied. It was filled with the above ink.

A magenta patch was then printed on the receiver C at 100% laydown using Hewlett-Packard Printer (HP540C) and the above cartridge.

All the receiving elements, except for a control, were submerged in a bath containing a hardener solution containing 1 wt. % of the hardener identified in Table 4 and allowed to air dry overnight.

The optical density of the elements was measured using an X-Rite ® densitometer. The elements were then immersed in distilled water. After 30 minutes, a portion of the element was rubbed vigorously about 7 times with a finger. After an hour, the elements were removed and then allowed to air dry overnight and the density remeasured. Water-fastness is measured as the per cent retained optical density after immersion in water. Values closest to 100% are preferred. Values over 100% indicate an undesirable "dot spread". The following results were obtained:

TABLE 4

| Hardener in Bath | % Retained Optical Density After | |
|---|---|---|
| | Water Test | Rub Test |
| None (control) | 88 | 88 |
| Aluminum nitrate (control) | 96 | 110 |
| 1 | 102 | 102 |
| 2 | 103 | 100 |
| 3 | 100 | 99 |
| 7 | 95 | 93 |
| 12 | 101 | 103 |
| 13 | 104 | 100 |

The above data show that an ink jet image obtained in accordance with the invention has superior water-fastness using one or both of the tests as compared to control elements not submerged in a hardener solution or a control element which was treated with a hardener solution which was not a sulfate of a trivalent metal.

Example 5

Preparation of Receiver E

A 102 μm poly(ethylene terephthalate) film support was coated with a subbing layer of acrylonitrile-vinylidene chloride-acrylic acid terpolymer latex (0.11 g/m$^2$). On top of the subbing layer was coated an ink-receiving layer of having an average size of 20 μm.

This example was the same as Example 2 except that Receiver E was used and different hardeners were used as shown in Table 5 along with a control where no hardener was used.

TABLE 5

| Hardener | % Total Retained Optical Density |
|---|---|
| No Hardener | 0 |
| 1 | 79 |
| 3 | 80 |

The above results show an ink jet image obtained in accordance with the invention has superior wet abrasion resistance as compared to a control element which was not treated with a hardener solution.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet printing process for improving the wet abrasion resistance of an ink jet image comprising the following steps in order:

a) providing an ink jet recording element comprising a support having thereon an image-recording layer comprising a cross-linkable polymer of gelatin or acetoacetylated poly(vinyl alcohol) and an anionic polymeric mordant comprising a polyester dispersion in water;

b) applying liquid ink droplets of a cationic, water-soluble dye on said image-recording layer in an image-wise manner; and c) applying an aqueous solution of an organic hardener or a sulfate of a trivalent metal to said image to cross-link said polymer.

2. The process of claim 1 wherein said solution of a hardener is applied by means of an ink jet print head.

3. The process of claim 1 wherein said solution of a hardener is applied by submerging said element in said aqueous solution of hardener to cross- link said polymer.

4. The process of claim 1 wherein said support is paper.

5. The process of claim 1 wherein said cross-linkable polymer is present in an amount of from about 5 to about 30 g/m$^2$.

6. The process of claim 1 wherein said mordant is present in an amount of from about 0.5 to about 5 g/m$^2$.

7. The process of claim 1 wherein an amount of said aqueous solution of hardener is applied so that the final coverage of said hardener is from about 0.00002 g/m$^2$ to about 0.001 g/m$^2$.

8. The process of claim 1 wherein said liquid ink has a water carrier.

9. The process of claim 1 wherein said sulfate of a trivalent metal is aluminum sulfate.

10. The process of claim 1 wherein said hardener is bis(vinyl sulfonylmethyl ether), glutaraldehyde, 2,3-dihydroxy- 1,4-dioxane or phthaldehyde.

* * * * *